Patented Mar. 29, 1932

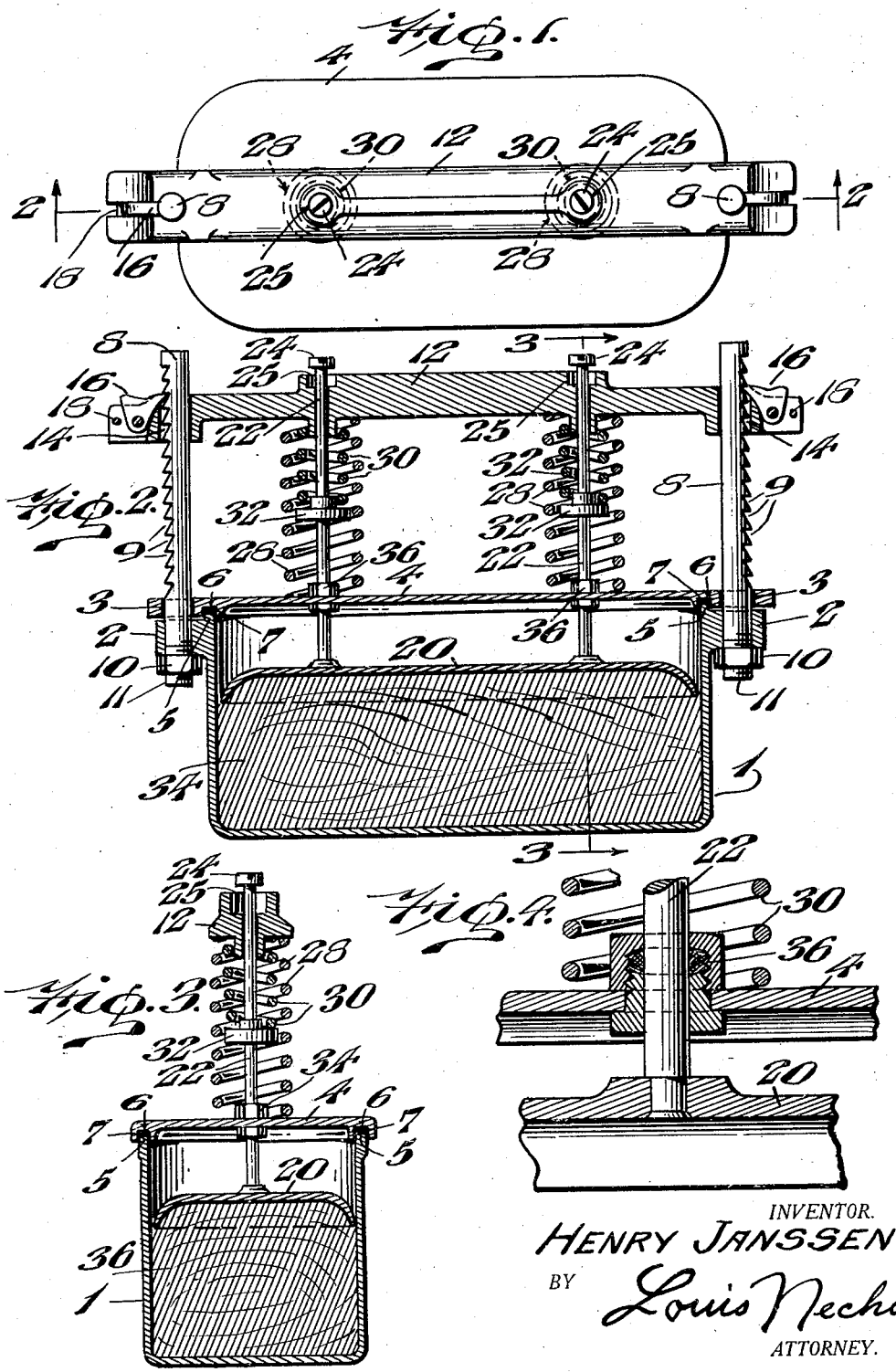

1,851,582

UNITED STATES PATENT OFFICE

HENRY JANSSEN, OF PHILADELPHIA, PENNSYLVANIA, ASSIGNOR OF ONE-HALF TO GUSTAVE F. KUHN, OF PHILADELPHIA, PENNSYLVANIA

AIR TIGHT MEAT COOKER AND PROCESSER

Application filed October 3, 1931. Serial No. 566,626.

My invention relates to a new and useful air tight meat cooker and processer in which meats can be cooked in their own juices in an air tight manner and in which the meat is subjected to even and constant pressure during the cooking and processing operation, so that it will need no further attention or pressure adjustment after the container has been closed.

My invention further relates to a novel meat cooker and processer, in which the closing of the container for securing an air tight condition and for compressing the meat can be accomplished with a single operation, greatly to reduce the cost of labor.

My invention further relates to a novel meat cooker and processer embodying various other novel features of construction and advantage, all as hereinafter described and claimed in connection with the accompanying drawings, in which:

Figure 1 represents a plan view of a meat cooker and processer embodying my invention.

Figure 2 represents a section on line 2—2 of Figure 1.

Figure 3 represents a section on line 3—3 of Figure 2.

Figure 4 represents a fragmentary sectional view, on enlarged scale, showing details of construction.

Referring to the drawings, in which like reference characters indicate like parts, 1 designates a container of any suitable shape, which is provided on its upper edge with the apertured lugs 2 which are adapted to align with corresponding holes 3 in the cover or lid 4. The lugs 2 are provided with the shoulder 5 which is adapted to fit into a groove 6 which contains the gasket 7 to produce an air tight connection between the cover 4 and the container 1. Through the apertured lugs 2 and through the holes 3 in the cover 4 are adapted to extend the stems 8 which are provided on one side thereof with the serrated or toothed edges 9. The stems or rods 8 are limited in their upward movement by the bottom nuts 10 which engage the lower threaded ends 11 of the rods 8, as will be understood from Figure 2. A crossbar 12 is provided with the apertures 14 in the ends thereof, through which the rods 8 are adapted to extend. To the apertured ends of the cross-bar 12 is pivoted the dog 16 which is adapted to engage the toothed or serrated edge 9 of the rods 8, and the movement of which is limited by the stop pin 18. 20 designates a plunger which is adapted to fit within the container 1, said plunger being carried by the rods 22 which extend upwardly through suitable apertures in the cover 4 and the cross-bar 12, and which are provided with the heads 24 which are adapted to be received in the seats 25. 28 designates outer springs which are confined between the cross-bar 12 and the cover 4, constantly to depress the cover 4 against the container 1 to secure an air tight connection between the shoulder 5 and the gasket 7 in the groove 6. Within the outer springs 28, and around the stems or rods 22 are the shorter springs 30 which are confined between the cross-bar 12 and the hub or boss 32 which is fast on the rods 22, the inner springs 30 thus serving to depress the plunger 22 over the meat 34 in the container 1. The openings in the cover 4, through which extend the rods 22, are provided with a suitable packing 36, such as is illustrated in Figure 4, to provide air tight connection. The operation is as follows: the meat 34 is first placed in the container, and the cover 4, carrying below it the plunger 20 and above it the cross-bar 12, is applied to the container 1 by slipping the rods or stems 8 upwardly through the apertures 3 in the cover 4 and the apertures 14 in the cross-bar 12. The cross-bar 12 is then depressed against the tension of the springs 28 and 30 to press the plunger 20 down upon the meat to the desired extent, thus simultaneously pressing the cover 4 against the container 1. When the cross-bar 12 is depressed downwardly, the dog 16 automatically engages the serrated edges 9 of the rods 8 to retain the cover 4 and plunger 20 in their lower depressed position against the tension of the springs 28 and 30. The heads 24 on the stems 22 afford a little play and serve to limit the upward movement of the cross-bar 12, as will be apparent from Figure 2. When it is desired to remove the cover 4 and its adjuncts, the cross-bar 12 is depressed slightly to permit disengagement of the dog 16 from the serrated edge 9 of the rod 8, whereupon the cover 4, together with the plunger 20 and the cross-bar 12 are lifted up as a unit.

Having thus described my invention, what I claim as new and desire to secure by Letters Patent is:

1. A meat cooker and processer comprising a container, a cover adapted to fit over said container in an air tight manner, an upper crossarm, stems carried by said crossarm, and stems passing through suitably packed openings in said cover and adapted to extend within said container, a plunger carried by said stems, outer springs wound around said stems and adapted to exert pressure upon said cover, inner springs wound around said stems and adapted to exert pressure upon said plunger, and means for retaining said crossbar, plunger and cover in adjusted depressed position.

2. A meat cooker and processer comprising a container having end apertured lugs, a cover adapted to fit over said container in an air tight manner, there being apertures in the periphery of said cover registering with the apertures in said lugs, an upper crossarm, stems carried by said crossarm, said stems passing through suitable openings in said cover and adapted to extend within said container, a plunger carried by said stems, outer springs wound around said stems and adapted to exert pressure upon said cover, inner springs wound around said stems and adapted to exert pressure upon said plunger, rods passing through said apertured lugs, through the openings in said cover and through registering openings in the ends of said crossbar, the outer edges of said rods being serrated, and dogs pivoted on the ends of said crossarm and adapted to engage the serrated edges of said rods to maintain said cover, plunger and crossarm in any adjusted depressed position.

In testimony whereof I affix my signature.

HENRY JANSSEN.